(12) United States Patent
Flick

(10) Patent No.: US 8,217,775 B2
(45) Date of Patent: Jul. 10, 2012

(54) METHOD AND DEVICE FOR WARNING THE DRIVER

(75) Inventor: Bernd Flick, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 453 days.

(21) Appl. No.: 12/518,229

(22) PCT Filed: Oct. 12, 2007

(86) PCT No.: PCT/EP2007/060867
§ 371 (c)(1),
(2), (4) Date: Dec. 2, 2009

(87) PCT Pub. No.: WO2008/068092
PCT Pub. Date: Jun. 12, 2008

(65) Prior Publication Data
US 2010/0085176 A1     Apr. 8, 2010

(30) Foreign Application Priority Data
Dec. 6, 2006   (DE) .................... 10 2006 057 424

(51) Int. Cl.
*B60Q 1/00* (2006.01)

(52) U.S. Cl. ......... 340/439; 340/438; 340/575; 340/576
(58) Field of Classification Search .................. 340/439, 340/438, 573.1, 575, 576
See application file for complete search history.

(56) References Cited

U.S. PATENT DOCUMENTS

| | | | |
|---|---|---|---|
| 5,923,256 A | | 7/1999 | Satake et al. |
| 7,116,234 B2 * | | 10/2006 | Mohri ................ 340/575 |
| 2004/0233060 A1 * | | 11/2004 | Mohri ................ 340/575 |

FOREIGN PATENT DOCUMENTS

| | | |
|---|---|---|
| EP | 1 418 082 | 5/2004 |
| JP | 10315799 | 2/1998 |
| WO | WO 2005/070727 | 8/2005 |

* cited by examiner

Primary Examiner — Travis Hunnings
(74) Attorney, Agent, or Firm — Kenyon & Kenyon LLP

(57) ABSTRACT

To warn the driver as a function of the driver condition, a standing acoustic wave is generated. The head of the driver is positioned in this standing wave in such a way that, in a setpoint position of the head, the ears of the driver come to lie in nodal points of the standing wave, and an acoustic warning signal is able to be perceived by the driver in a deviation therefrom.

10 Claims, 2 Drawing Sheets

METHOD AND DEVICE FOR WARNING THE DRIVER

FIELD OF THE INVENTION

The present invention relates to a method for warning the driver of a vehicle as a function of the driver condition.

BACKGROUND INFORMATION

Video systems are known to detect the driver condition and to warn him especially when he is at risk of falling asleep, which systems monitor for how long the driver keeps the eyes closed while driving (Japanese Patent No. JP-10315799) and which wake the driver by an acoustic warning sound once a threshold is exceeded, or which keep him in the awake state. A similar video system for monitoring the eyes of the driver is known from European Patent No. EP 1 418 082.

SUMMARY OF THE INVENTION

The method and system according to the present invention have the advantage that the driver is warned directly, without video monitoring, when his head drops briefly to the side or the front. The present invention thus effectively prevents what is known as micro sleep, which frequently results in death. No evaluation devices whatsoever or activation mechanisms for outputting a warning signal are required. As a result, the method is reliable and robust with respect to spontaneously occurring interruptions of evaluation devices and warning signal devices.

The present invention utilizes the recognition that the introduction of the head of the driver into a standing acoustic wave such that, in a setpoint position of the head, the ears of the driver come to lie in nodal points of the standing wave, and a signal by the standing acoustic wave is not able to be perceived by the driver or is not irritating. On the other hand, if the driver moves his head relative to the setpoint position and thus is outside a nodal point of the standing wave, then he perceives an acoustic warning signal by the standing wave, which is loudest in an anti-node of the standing wave.

To generate the standing wave, two loudspeakers at a defined distance are preferably controlled in phase opposition, in the simplest case by a sinus tone.

If the acoustic standing wave or the sinus tone is generated at a frequency at which the human ear is most sensitive, e.g., at 1 KHz, then relatively little energy has to be expended for rousing or for maintaining the alert state.

To correct the setpoint position of the head, the structure-borne noise, which occurs as an interference variable when the head is introduced into the standing wave (deviating propagation speed of the sound), is preferably taken into account.

It is useful if the exciters/loudspeakers of the standing wave are disposed in the region of or inside the driver seat headrest of the vehicle and/or in the B-column close to the driver. In this way no additional devices are required to accommodate or fix the exciters/loudspeakers into place, and the setpoint position is able to be preadjusted precisely.

DETAILED DESCRIPTION

Figure 1:
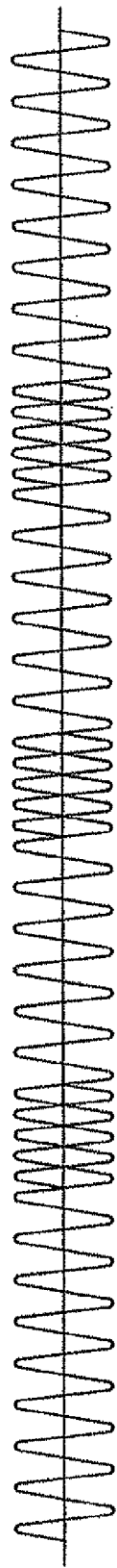
FIG. 1 shows two 180° out-of-phase sinus tones having the same frequency.
Figure 2:
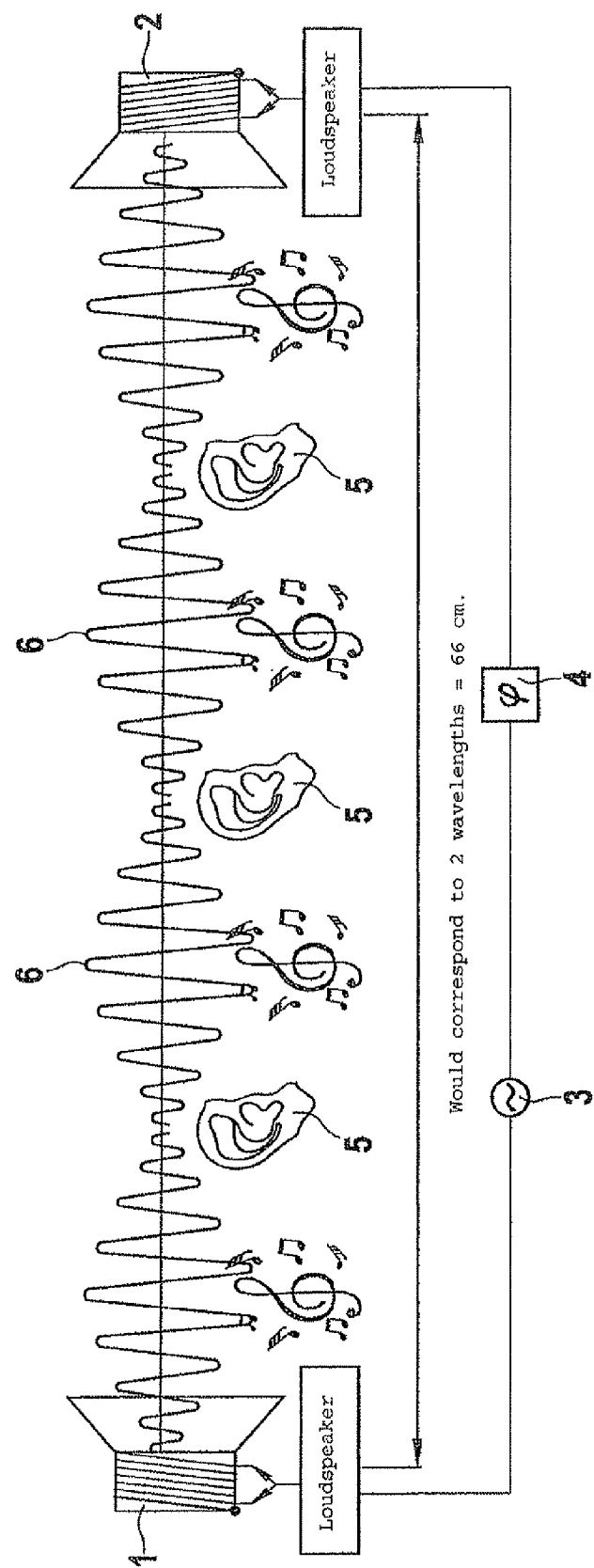
FIG. 2 shows the addition of these 180° out-of-phase sinus tones with nodal points and anti-nodes, and symbolic representation of the ears in the nodal points.

FIG. 1 shows two 180° out-of-phase sinus tones having the same frequency. As illustrated in FIG. 2, such 180° out-of-phase sinus tones are able to be generated by two loudspeakers 1 and 2 facing one another and placed at a defined distance, which sinus tones are generated by a shared generator 3 in the simplest case; a 180° phase shifter may be situated in the signal path of one of the loudspeakers. The phase opposition is already able to be achieved by the reflection of the sound wave. The superpositioning of the 180° out-of-phase sinus tones to a standing wave is also shown in FIG. 2. The head of the driver is then positioned in this standing wave between loudspeakers 1 and 3 in such a way that, in a setpoint position, ears 5 of the driver come to lie in the nodal point of the standing wave—lowest amplitude. In this setpoint position the driver does not perceive a sinus tone. If the driver then grows tired so that he can no longer hold up his head and the head tilts forward or sideways, then his ears are situated outside the nodal points and he hears the sinus tone as a warning signal and wakes up. It is preferred to use a sinus tone having a frequency of 1 KHz because the human ear exhibits the greatest sensitivity here (dBA curve). Compared to the setpoint position, there is an anti-node 6 at a distance of 8.25 cm at this frequency, where the sinus tone/warning signal is loudest (symbolized by the clef and notes in FIG. 2). An interference variable to be taken into account is the structure-borne noise that occurs by the introduction of the head into the standing wave. Since the propagation speed of the sound is considerably greater in the head than in air, the correction of the setpoint position, i.e., the position of the head with respect to the affixation of loudspeakers 1, 2 must be considered/corrected accordingly. The nodal points at the ear remain when the head is introduced into the standing wave.

The exciters of the standing wave, i.e., loudspeakers 1 and 2, shown in the exemplary embodiment may be situated in the driver seat headrest of the vehicle or in its vicinity. It may be advantageous to integrate one of the loudspeakers into the B column near the driver as well, and to integrate the other in the driver seat headrest or the passenger seat headrest. Additional affixation devices for loudspeakers 1 and 2 can thus be dispensed with.

Instead of a sinus tone, it is also possible to use a tone mixture or a noise that leads to increased attention and to waking of the driver outside of the setpoint position.

If the frequency of the standing wave is modified, then another wavelength results and thus other node locations. This will then require a new correction of the setpoint position, i.e., the nodal points appear in other locations, and the position of the ears with respect to the two sound sources must thereupon be modified.

What is claimed is:

1. A method for warning a driver as a function of a driver condition, comprising:
   generating a standing acoustic wave; and
   positioning the head of the driver in a region of the standing wave in such a way that, in a setpoint position of the head, the ears of the driver come to lie in nodal points of the standing wave, and if a head position deviates from the setpoint position, the driver is able to perceive an acoustic warning signal by the standing wave.

2. The method according to claim 1, wherein, to generate the standing acoustic wave, two loudspeakers at a defined distance are controlled by a sinus tone.

3. The method according to claim 2, wherein the acoustic standing wave or the sinus tone is generated at a frequency at which the human ear exhibits its greatest sensitivity.

4. The method according to claim 1, wherein, to correct the setpoint position of the head, structure-borne noise that occurs as an interference variable by introducing the head into the standing wave is taken into account.

5. A system for warning a driver as a function of a driver condition, comprising:
an exciter system for generating an acoustic standing wave, the exciter system being positioned with respect to a setpoint position of the head of the driver in such a way that, in the setpoint position, the ears of the driver come to lie in a nodal point of the standing wave, and an acoustic warning signal by the standing wave is able to be perceived by the driver when a deviation from the setpoint position has occurred.

6. The system according to claim 5, wherein the exciter system includes two loudspeakers, to which an acoustic signal, having a sinus tone, is applied.

7. The system according to claim 6, wherein the acoustic signal has a frequency at which the human ear is highly sensitive.

8. The system according to claim 6, wherein for a position of the exciters of the standing wave, loudspeakers, or their mutual distance with respect to the setpoint position of the head, structure-borne noise that occurs as an interference variable by introduction of the head into the standing wave is taken into account.

9. The system according to claim 6, wherein the exciters of the standing wave or loudspeakers are situated in a driver-seat headrest of a vehicle or proximate thereto.

10. The system according to claim 6, wherein a first exciter for the standing wave or a first loudspeaker is situated in a B-column near the driver, and an associated second exciter or second loudspeaker is situated in a driver-seat headrest.

* * * * *